United States Patent
Frank et al.

(10) Patent No.: US 10,946,778 B2
(45) Date of Patent: Mar. 16, 2021

(54) SEAT CUSHION ASSEMBLY WITH POCKET

(71) Applicant: Lear Corporation, Southfield, MI (US)

(72) Inventors: Thomas Frank, Ismaning (DE); Marc Herrmann, Seeburg (DE); Ulrich Schneider, Isen (DE); Otakar Pok, Plzen (DE); Stefan Gottauf, Ismaning (DE)

(73) Assignee: Lear Corporation, Southfield, MI (US)

( * ) Notice: Subject to any disclaimer, the term of this patent is extended or adjusted under 35 U.S.C. 154(b) by 20 days.

(21) Appl. No.: 16/004,024

(22) Filed: Jun. 8, 2018

(65) Prior Publication Data

US 2019/0039493 A1    Feb. 7, 2019

(30) Foreign Application Priority Data

Aug. 3, 2017  (DE) .................... 10 2017 213 484.4

(51) Int. Cl.
| | |
|---|---|
| *B60N 2/90* | (2018.01) |
| *B60N 2/70* | (2006.01) |
| *B60N 2/66* | (2006.01) |
| *B60N 2/72* | (2006.01) |

(52) U.S. Cl.
CPC ............ *B60N 2/914* (2018.02); *B60N 2/665* (2015.04); *B60N 2/70* (2013.01); *B60N 2/7017* (2013.01); *B60N 2/7094* (2013.01); *B60N 2/72* (2013.01); *B60N 2/99* (2018.02)

(58) Field of Classification Search
None
See application file for complete search history.

(56) References Cited

U.S. PATENT DOCUMENTS

| | | | |
|---|---|---|---|
| 4,115,170 A | 9/1978 | Sanson | |
| 6,220,663 B1 * | 4/2001 | Benden ................ | A47C 7/467 297/284.6 |
| 7,823,912 B2 | 11/2010 | Tracht et al. | |
| 8,398,112 B2 | 3/2013 | Tracht | |
| 9,845,035 B2 * | 12/2017 | Hosbach .............. | A47C 7/467 |
| 2005/0273936 A1 * | 12/2005 | Chul .................. | A47C 4/54 5/654 |
| 2010/0244504 A1 * | 9/2010 | Colja ................. | A61H 9/0078 297/180.1 |
| 2013/0169010 A1 * | 7/2013 | Sugiyama ............. | B60N 2/22 297/216.13 |
| 2017/0368969 A1 * | 12/2017 | Shibata ............... | B60N 2/914 |
| 2017/0368972 A1 * | 12/2017 | Fujikake .............. | B60N 2/665 |
| 2018/0056836 A1 * | 3/2018 | Schacht .............. | B60N 2/914 |
| 2018/0170222 A1 * | 6/2018 | Patrick .............. | B60N 2/914 |

FOREIGN PATENT DOCUMENTS

| | | |
|---|---|---|
| DE | 102012201430 A1 | 4/2013 |
| WO | 2015189394 A1 | 12/2015 |

OTHER PUBLICATIONS

German Office Action issued in corresponding case No. DE 102017213484.4; dated Mar. 28, 2018; 6 pages.

* cited by examiner

*Primary Examiner* — David R Dunn
*Assistant Examiner* — Christopher E Veraa
(74) *Attorney, Agent, or Firm* — Brooks Kushman P.C.

(57) ABSTRACT

A seat assembly is provided with a foam cushion and a fabric portion connected to a B-surface opposite a seat surface of the foam cushion. At least one pocket cavity is defined between the fabric portion and the foam cushion. A pneumatic support assembly is contained in the at least one pocket cavity.

19 Claims, 2 Drawing Sheets

SEAT CUSHION ASSEMBLY WITH POCKET

CROSS-REFERENCE TO RELATED APPLICATIONS

This application claims foreign priority benefits under 35 U.S.C. § 119(a)-(d) to DE 10 2017 213 484.4, filed Aug. 3, 2017, the disclosure of which is hereby incorporated by reference in its entirety.

TECHNICAL FIELD

Various embodiments are directed to a cushion assembly for vehicle seat.

BACKGROUND

For comfort and health reasons, vehicle seat assemblies may include a pneumatic support systems having inflatable bladders for providing support to the occupant along various regions of the seat back and seat bottom. An example of a vehicle seat with inflatable bladders is shown in U.S. Patent Publication US2015/0352990 by Lear Corporation.

SUMMARY

According to at least one embodiment, a seat assembly is provided with a foam cushion and a fabric portion connected to a B-surface opposite a seat surface of the foam cushion. At least one pocket cavity is defined between the fabric portion and the foam cushion. A pneumatic support assembly is contained in the at least one pocket cavity.

In another embodiment, the pneumatic support assembly has at least one inflatable bladder. In another embodiment, the pneumatic support assembly also has a pneumatic pump in fluid communication with the at least one inflatable bladder.

In another embodiment, the at least one pocket cavity has a plurality of pocket cavities positioned between the fabric portion and the foam cushion.

In another embodiment, the fabric portion has a first layer of fabric attached to the B-surface of the foam cushion and a second layer of fabric joined to the first layer of fabric. The at least one pocket cavity is formed between the first and second layers of fabric.

In another embodiment, the fabric portion has a layer of fabric attached to the B-surface of the cushion. The at least one pocket cavity is formed between the layer of fabric and the foam cushion.

In at least one embodiment, a seat assembly is provided with a seat cushion and a fabric pocket attached to a B-surface, opposite a seating surface of the seat cushion. A frame is positioned adjacent the B-surface of the seat cushion. The fabric pocket is between the seat cushion and the frame.

In another embodiment, the fabric portion comprises a plurality of pocket cavities. At least one inflatable bladder is contained in one of the plurality of pocket cavities. A pneumatic pump is contained in another of the plurality of pocket cavities.

In another embodiment, the fabric portion comprises an opening to access the pocket cavity. In another embodiment, the fabric pocket is formed along one of a bolster region and a lumbar region of a seat back.

In at least one embodiment, a method of forming a seat assembly is provided. The method includes forming a cushion assembly by inserting a fabric portion in a mold and injecting foam into the mold to co-mold the fabric portion and foam. At least one pocket cavity is defined and positioned between the fabric portion and the foam. The pocket cavity has an access opening in the fabric portion.

In another embodiment, defining the at least one pocket cavity includes joining a first layer of fabric to a second layer of fabric to form the fabric portion. The pocket cavity is formed between the first and second layers of fabric.

In another embodiment, joining the first and second layers of fabric includes sewing the first layer of fabric to the second layer of fabric.

In another embodiment, joining the first and second layers of fabric includes welding the first layer of fabric to the second layer of fabric.

In another embodiment, joining the first and second layers of fabric includes thermal bonding the first layer of fabric to the second layer of fabric.

In another embodiment, the method includes providing a seat frame adjacent a B-surface of the cushion assembly. The at least one pocket cavity is positioned between the cushion assembly and the seat frame.

In another embodiment, the method includes inserting a pneumatic support assembly in the at least one pocket cavity.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Pneumatic adjustment systems, such as pneumatic lumbar adjustment systems, are commonly attached to the suspension mat connected to the seat frame. In these systems, the foam seat cushion can only be assembled after the pneumatic adjustment system is assembled to the frame.

Figure 1:
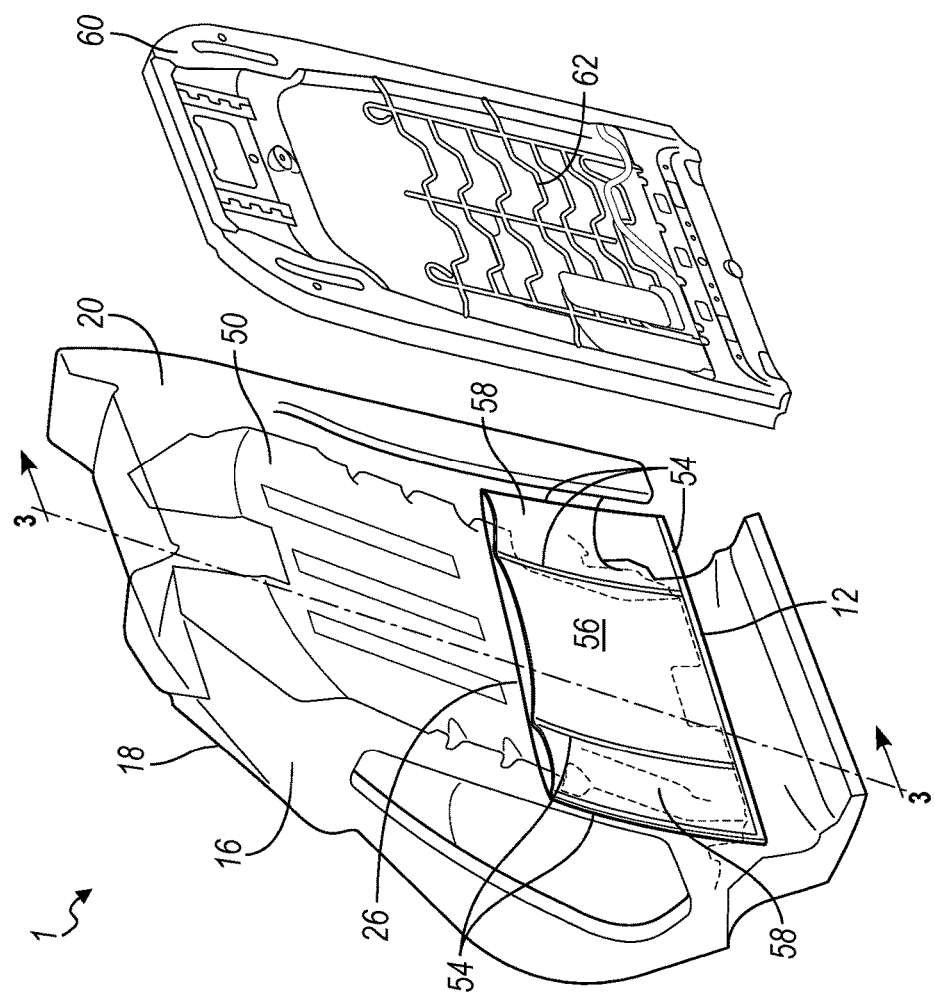
FIG. 1 illustrates an exploded perspective view of a portion of a seat assembly according to one embodiment of the present application.

FIG. 1 shows an exploded view of a seat assembly 1 according to one embodiment of the present application.

The seat assembly 1 includes a cushion assembly 10 that has a material pocket 12 to attach a pneumatic adjustment system to the seat back 14. The material pocket 12 is attached to a foam cushion 16. As illustrated in FIG. 1, the cushion assembly 10 illustrates a seat back, however the material pocket 12 may be formed on a seat bottom or other portion of a seat.

The cushion 16 defines a seating surface 18, or an A-surface. The foam seat cushion 16 may be covered by a trim cover along the A-surface 18. The material pocket 12 is formed on a B-surface 20, or back surface of the foam cushion 16.

The pocket 12 is defined along the B-surface 20 with woven or non-woven fabric material, which may include natural or synthetic materials such as nylon. In one embodiment, the fabric material is a polyester material, or other polymer material, such as fleece. The cushion 16 is made from a molded polymeric material, such as a polyurethane foam. Of course, other types of polymeric materials may be molded to form the cushion 16.

The pocket fabric is molded to the cushion 16 at the same time with the foam cushion 16 is molded. That is the fabric is co-molded to the cushion 16 in the same step while molding the foam cushion 16. The pocket fabric is placed in a mold and the foam cushion 16 is formed around it. Molding the pocket fabric at the same time helps to ensure that the pocket 12 will be accurately located relative to the foam cushion 16, thereby accurately locating the pneumatic adjustment system relative to the foam cushion 16. Additionally, the use of adhesive can be eliminated, as the foam material used for the cushion 16 will naturally adhere to the pocket fabric during the molding process.

Figure 2:
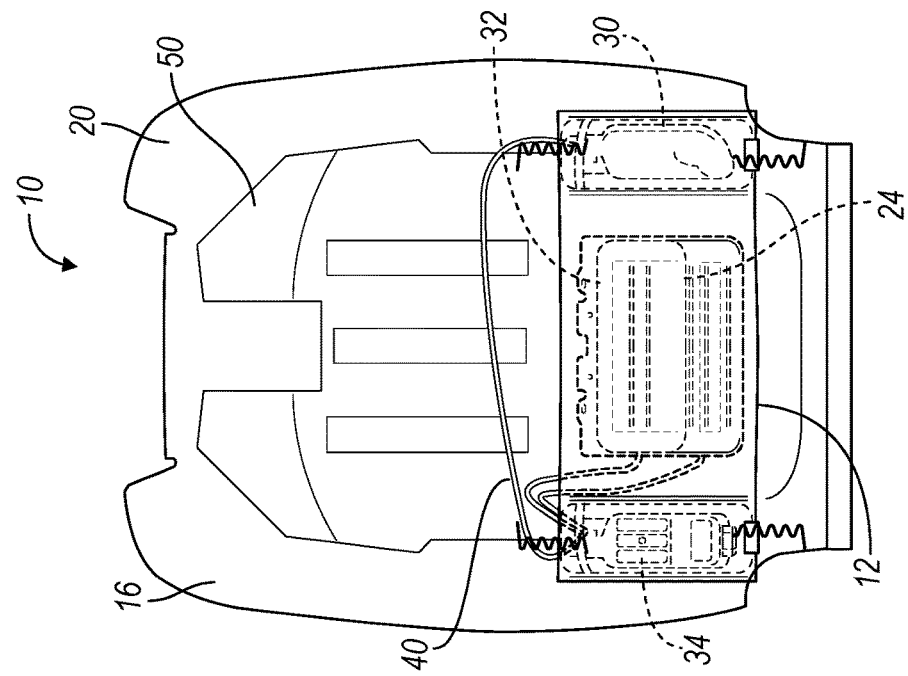
FIG. 2 illustrates a rear view of the portion of a seat assembly in FIG. 1 with a pneumatic support assembly installed.

As shown in FIG. 2, the pneumatic adjustment system 24 is held in the pockets 12. The pocket 12 is open along the top 26 to allow insertion of pneumatic adjustment system into the pocket 12. The pneumatic adjustment system 24 may include a pump/compressor 30 for supplying air to a plurality of air cells, or air bladders 32. The pneumatic adjustment system 24 may also include a valveblock 34 or electronic control unit (ECU) to control the supply of air to each of the air bladders 32. Air tubing 40 and wiring 42 extend through the top opening 26 to connect the components of the pneumatic adjustment system 24. Wiring 42 may also be extend through access-holes formed in the fabric of the pockets 12.

Figure 3:
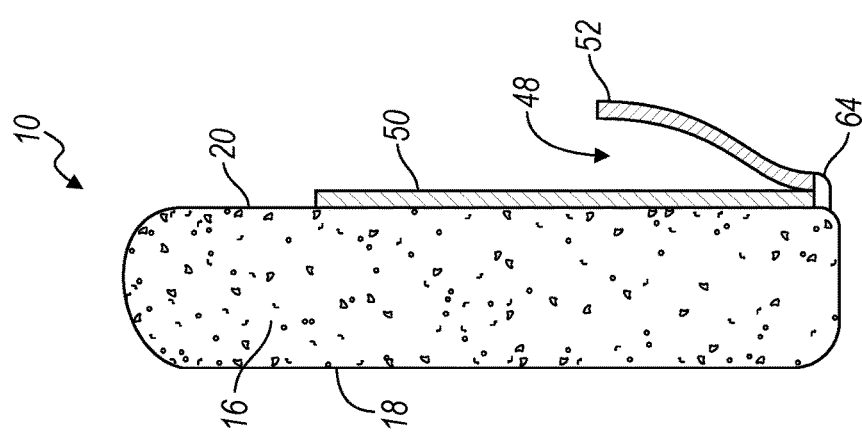
FIG. 3 is a section view through section 3-3 of FIG. 1.

The pocket 12 may be formed using a double layer of fabric or a single layer fleece or fabric material. As shown in detail in the cross section view in FIG. 3, a double layer pocket may have a first fabric layer 50 and a second fabric layer 52 that are joined together. The first and second fabric layers 50, 52 may be joined together at join locations 54 by sewing, thermal bonding, friction welding or any suitable method for joining the fabric layers 50, 52. The fabric layers 50, 52 are join at join locations 54 along at least two edges to form the pocket cavity 48 therebetween.

As shown in FIG. 1-2, the pocket 12 may have additional join locations 54 bonding the first and second fabric layers 50, 52 together to form additional pocket compartments in the pocket 12. The pocket 12 may be divided into a plurality of separate pockets compartments to house various components of the pneumatic adjustment system 24. For example, as shown in FIG. 2, a central pocket 56 contains the air bladders 32 that are positioned in the central lumbar region of the seat back 14. Lateral pockets 58 are positioned along each of the lateral sides of the central pocket 56. The lateral pockets 58 may house the pump 30, compressor and/or the valveblock 34 or electronic control unit (ECU), as shown in FIG. 2.

Figure 4:
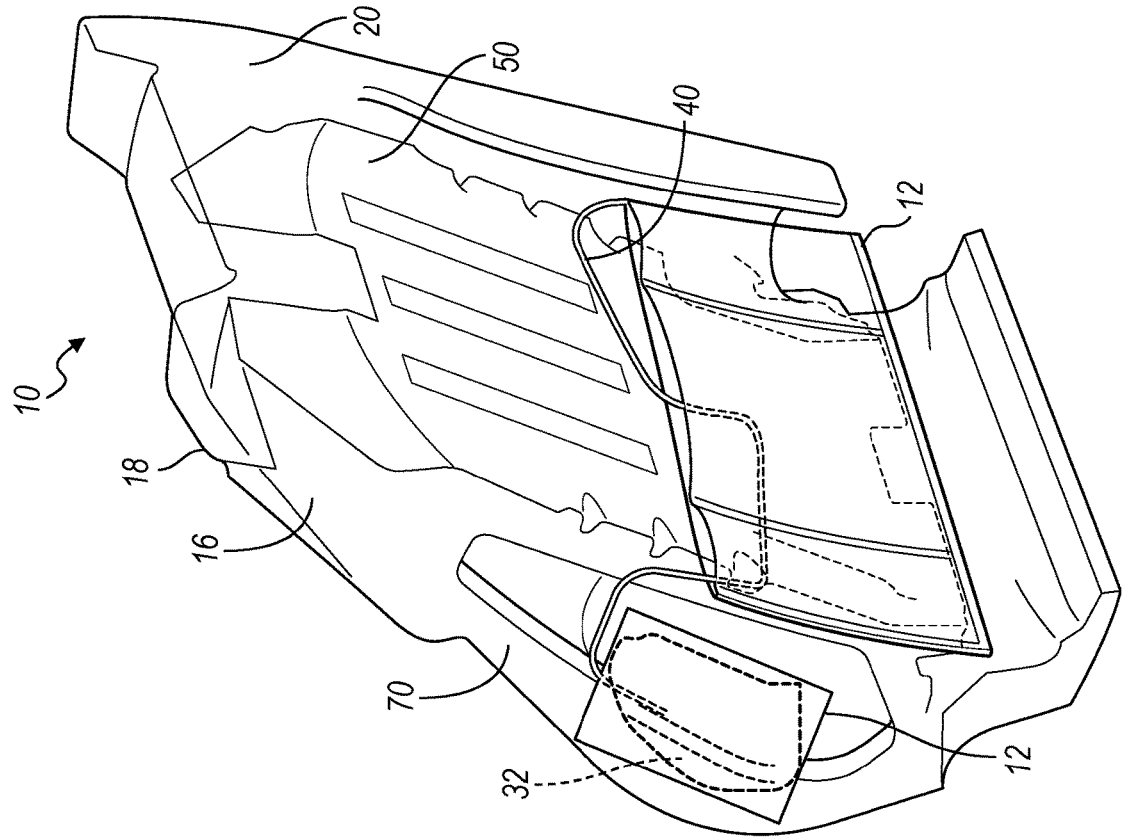
FIG. 4 illustrates a perspective view of a portion of a seat assembly according to one other embodiment of the present application.

As shown in FIGS. 1-2, the air bladders 32 may be positioned along the in a central pocket 58 in the lumbar region of the seat back to provide lumbar support. However, the pocket 12 may be positioned at any location along the cushion 16 to correspond with desired location of air bladders, such as in the thoracic region, cervical region, pelvic region or other regions of a seat back or a seat bottom. As shown in FIG. 4, air bladders 32 may also be positioned in the bolster cushion 70 to probide side support. However, the air bladders 32 and pneumatic adjustment system 24 may be positioned at any suitable location along the B-surface 20 of the cushion 16.

Pneumatic adjustment systems, including lumbar air bladders, are commonly attached to a suspension mat that forms part of the frame of the seat back. The bladders are attached by using flaps, felt cutouts or clips. Similarly, pneumatic adjustment systems with side support air bladders are commonly attached to either a seat pre-mounted plastic carrier or to separate carrier plates as part of delivery unit. The air bladders fixed by clips, pins or foil straps to the carrier. The foam can only be assembled to the seat back after the pneumatic adjustment system is first assembled to the frame.

The seat assembly 1 of the present application provides several improvements over the prior designs. As shown in the exploded view in FIG. 1, the cushion assembly 10 and pocket 12 holds the pneumatic adjustment system 24 without any attachments by the pneumatic adjustment system 24 to the frame 60 or the frame suspension mat 62. The cushion assembly 10 provides improved performance of pneumatic bladders 32 including higher efficiency due to improved support on the B-surface of the cushion 16. Since the pneumatic assembly is not directly attached to the frame 60 and suspension mat 62, there is also a cost reduction by eliminating attachment features such as clips.

The seat assembly 1 with the cushion assembly 10 and pocket 12 that contains the pneumatic adjustment system also has less risk of contact noises due to the pneumatic system contacting the suspension mat 62 or frame 60. Contact noises may also be reduced due to less deflection of the suspension mat 62.

The seat assembly 1 with the cushion assembly 10 provides a more rigid B-surface 20 due to the pocket 12 that covers the B-surface 20. The seat assembly 1 with a stiffer B-surface 20 of the cushion 16 provides higher durability of the suspension mat 62 because less load is transferred from passenger due to the B-surface 20 providing more rigid support. The stiffer B-surface 20 also provides improved whiplash behaviour in case of crash due to less deflection of the suspension mat 62. The cushion assembly 10 also provides improved whiplash behaviour in case of crash due to better support for lower spine by reducing foam displacement due to the stiffer B-surface 20 having a pocket 12.

Figure 5:
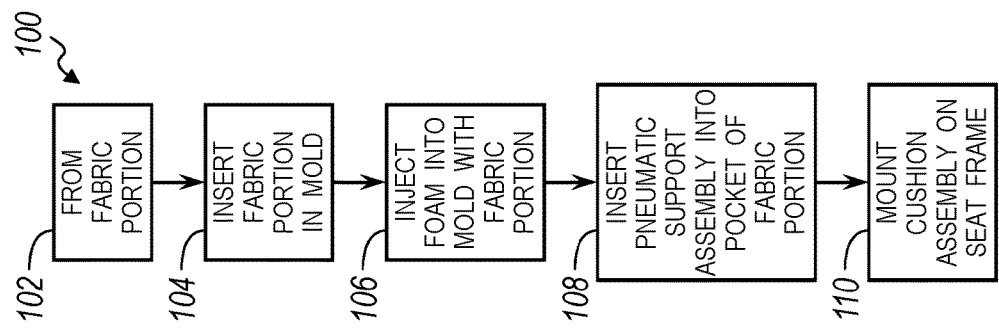
FIG. 5 is a block diagram flow chart illustrating a method of forming a seat assembly in FIG. 1, according to one embodiment of the present application.

FIG. 5 is a flow chart illustrating the method 100 of forming the seat assembly. At block 102, the fabric portion is formed. For a single layer pocket, the fabric portion may be formed and sized to cover a portion of the B-surface of the cushion. For a double layer pocket, the first and second fabric layers are joined together to form a pocket between the two layers. The first and second fabric layers are joined on at least two side to define a pocket cavity. The pocket layers are joined by sewing, thermal bonding, friction welding or any suitable method. The fabric portion may also be formed to have multiple pocket compartments. The completed fabric portion is inserted in a mold tool, as shown at block 104.

After the fabric portion is inserted in the mold too, the foam molding process is completed, including injecting the foam material into the mold tool, as shown at block 106. The foam material expands and cures in the mold tool under heat and/or pressure. The fabric layer is joined to the foam during the molding process. For a single layer pocket, edge regions of the fabric portion are adhered to the foam cushion during molding, and a pocket cavity is formed along areas that are masked. For a double layer pocket, only the first layer is adhered to the foam cushion during molding. The pocket cavity is formed between the first and second fabric layers.

After the fabric portion and foam material are co-molded, the pneumatic support assembly can be inserted in the pocket cavities, as shown at block 108. The pocket cavity is formed between the B-surface of the cushion and a layer of fabric that can receive the air bladders and pump or other pneumatic support assembly components.

Finally, at block 110, the cushion assembly, including the foam cushion and the pneumatic support assembly contained in the pocket, is mounted to the seat frame.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a foam cushion having a seat support surface;
   a fabric portion connected to a B-surface opposite the seat support surface of the foam cushion, wherein the fabric portion comprises:
      a first layer of fabric attached to the B-surface of the foam cushion; and
      a second layer of fabric joined to the first layer of fabric, wherein at least one pocket cavity is formed between the first and second layers of fabric and an access opening is defined between the first and second layers to access the at least one pocket cavity; and
   a pneumatic support assembly positioned in the at least one pocket cavity via the access opening.

2. The seat assembly of claim 1, wherein the pneumatic support assembly comprises at least one inflatable bladder.

3. The seat assembly of claim 2, wherein the pneumatic support assembly further comprises a pneumatic pump in fluid communication with the at least one inflatable bladder, wherein the pump is disposed in the at least one pocket cavity.

4. The seat assembly of claim 3, wherein the pneumatic assembly comprises:
   at least one of tubing and wiring extending through the access opening to connect the at least one inflatable bladder and pneumatic pump.

5. The seat assembly of claim 4, wherein the pneumatic assembly comprises:
   a plurality of inflatable bladders;
   a valve block in communication with the plurality of inflatable bladders and the pneumatic pump to control the supply of air to each of the plurality of inflatable bladders independently, the valve block disposed in a third pocket cavity.

6. The seat assembly of claim 1, wherein the at least one pocket cavity comprises a plurality of pocket cavities positioned between the fabric portion and the foam cushion.

7. The seat assembly of claim 6, wherein the pneumatic support assembly comprises at least one inflatable bladder and a pneumatic pump in fluid communication with the at least one inflatable bladder, wherein the at least one inflatable bladder is contained in one of the plurality of pocket cavities, and the pneumatic pump is contained in another of the plurality of pocket cavities.

8. The seat assembly of claim 1, further comprising a frame positioned adjacent the B-surface of the seat cushion, wherein the pocket cavity is between the seat cushion and the frame.

9. The seat assembly of claim 8 wherein the pocket cavity is formed along one of a bolster region and a lumbar region of a seat back.

10. A seat assembly comprising:
    a foam cushion having a seat support surface;
    a fabric portion co-molded to a B-surface opposite the seat support surface of the foam cushion, the fabric portion having a first and second fabric layers, wherein at least one of the first and second fabric layers is co-molded to the B-surface,
    wherein at least one pocket cavity is formed between the first and second layers of fabric and an access is defined between the first and second layers to access the at least one pocket cavity; and
    at least one inflatable bladder positioned in the pocket cavity via the access opening.

11. The seat assembly of claim 10, further comprising a pneumatic pump in fluid communication with the at least one inflatable bladder, wherein the fabric portion comprises at least two pocket cavities, wherein the inflatable bladder is positioned in one of the two pocket cavities, and the pump is positioned in the other of the two pocket cavities.

12. The seat assembly of claim 11, further comprising:
    at least one of tubing and wiring extending through the access opening to connect the at least one inflatable bladder and the pneumatic pump.

13. A seat assembly comprising:
    a foam cushion having a seat support surface;
    a fabric portion co-molded to a B-surface opposite the seat support surface of the foam cushion to form at least one pocket cavity and having an access opening to access the at least one pocket cavity after the fabric portion is co-molded to the foam cushion, wherein the fabric portion comprises a first fabric layer and a second fabric layer, wherein the pocket cavity is formed between the first and second layers of fabric; and
    a pneumatic support assembly comprising at least one inflatable bladder positioned in the pocket cavity via the access opening.

14. The seat assembly of claim 13, wherein at least one of the first and second fabric layer is co-molded to the B-surface.

15. The seat assembly of claim 13, wherein the fabric portion comprises:
    a layer of fabric co-molded to the B-surface of the cushion, wherein the at least one pocket cavity is formed between the layer of fabric and the foam cushion.

16. The seat assembly of claim 13, wherein the at least one pocket cavity comprises a plurality of pocket cavities positioned between the fabric portion and the foam cushion.

17. The seat assembly of claim 16, wherein the pneumatic assembly comprises:
    a plurality of inflatable bladders disposed in a first pocket cavity;
    a pneumatic pump in fluid communication with the plurality of inflatable bladders and disposed in a second pocket cavity.

18. The seat assembly of claim 17, wherein the pneumatic assembly comprises:

at least one of tubing and wiring extending through the access opening to connect the inflatable bladders and pneumatic pump.

19. The seat assembly of claim 18, wherein the pneumatic assembly comprises:
a valve block in communication with the plurality of inflatable bladders and the pneumatic pump to control the supply of air to each of the plurality of inflatable bladders independently, the valve block disposed in a third pocket cavity.

* * * * *